3,067,048
PROCESS FOR PRODUCING SINTERED BERYLLIUM OXIDE AND RESULTANT PRODUCTS
Léon Gion, Lourdes, France, assignor to Pechiney Compagnie de Produits Chimiques et Electrometallurgiques, Paris, France, a corporation of France
No Drawing. Filed Dec. 8, 1959, Ser. No. 858,026
Claims priority, application France Dec. 12, 1958
9 Claims. (Cl. 106—58)

The present invention, which is based on applicant's researches, has for its object a process for preparing sintered beryllium oxide and the products resulting from said process, which products possess high chemical purity, an "open" porosity of substantially zero, and a density equal to or in excess of 2.85.

Another object of the process of the invention is to obtain a product which has been sintered at a temperature not substantially in excess of 1600° C.

It is known that pure oxide of beryllium can be prepared industrially by first forming a hydroxide precipitate in an aqueous phase, which is collected and calcined to yield an anhydrous oxide.

It is also known that it is possible to control the operating conditions of such hydroxide preparation so as to obtain either a light hydroxide precipitate, or a heavy hydroxide precipitate or, finally, a mixture of light and heavy precipitates, the proportions of this mixture being controllable at the will of the operator (cf. French Patent No. 1,130,111 of June 21, 1955).

According to the present invention, one starts from a powdered mixture of (a) pure, so-called light beryllium oxide, having an apparent density ranging between 0.2 and 0.3 and a specific surface of the order of 100,000 cm.$^2$/g., and (b) pure, so-called heavy beryllium oxide, having a density ranging between 1.0 and 1.2 and a specific surface of the order of 5,000 cm.$^2$/g. (The numerical values of the specific surfaces are those obtained by the Blaine method.)

Preferably, the contents of the mixture in light oxide and in heavy oxide are such that the mixture can be ground (as set out hereinafter) to a fineness corresponding to a specific surface of 18,000 to 22,000 cm.$^2$/g., as measured by the Blaine method. This can correspond to a content of about 80% (by weight) of heavy oxide in the mixture.

To form this mixture, one preferably starts from light and heavy hydroxides prepared separately. The hydroxides are calcined separately at about 1000° C. to transform them into oxides, which are then mixed in the desired proportion; the powdered mixture used according to the present invention is, therefore, formed of substantially anhydrous oxides.

There is added to this powdered mixture a small proportion of a very pure oxide of an alkaline-earth metal, preferably, an oxide of calcium or of magnesium, in a very fine state of subdivision, preferably corresponding to a specific surface (according to Blaine) in excess of 22,000 cm.$^2$/g. The suitable proportion of oxide is, in general, below about 0.6%. The oxide can be replaced by an alkaline-earth metal salt which is transformable into an oxide by being decomposed during the sintering operation (heating), whereby the acid radical of the salt is completely driven off during the heating; such action takes place in the case of carbonates, nitrates and most of the organic salts.

The powdered mixture to which has been added an oxide or a salt of an alkaline-earth metal is subjected to grinding in a ball mill. To avoid any possible contamination, this mill can be lined either with beryllia bricks or, else, with rubber, and there should be likewise used grinding elements of beryllia or of silicate of alumina having a high resistance to abrasion.

The ground product is dried, its specific surface then ranging within the limits above indicated. There is then added thereto 5 to 8% of an organic binder, whereupon it is subjected to agglomeration according to a method common in ceramic work, as pressing or tamping, and it is finally baked at a temperature which does not exceed about 1600° C. The resultant product possesses an open porosity of substantially zero, and a density which can reach and exceed 2.90.

For example, one can start from a mixture of (a) 20 parts of beryllium oxide having an apparent density of 0.27 and a specific surface greater than 100,000 cm.$^2$/g., and (b) 80 parts of beryllium oxide of an apparent density of 1.15 and a specific surface of the order of 5,000 cm.$^2$/g. This mixture is recalcined at 1000° C.; there is then added thereto 1 part of very pure precipitated calcium carbonate, and the mixture is ground in a rubber lined mill provided with beryllia balls. The ground, dried mixture has a specific surface of 20,000 cm.$^2$/g. There is added thereto 7% glycol stearate, and the mixture is then agglomerated by tamping into the shape of bricks, which are baked at 1600° C. The resultant sintered product possesses an open porosity of substantially zero and a density of 2.90.

The use of calcium oxide as a recrystallization agent is of great importance; indeed, this is a very active agent and makes possible the obtainment of a sintered product at a relatively low temperature of the order of 1600° C., that is to say, at about 200 degrees below the temperature at which sintering would start in the absence of such an addition. This reduction in temperature not only simplifies the technical problems involved in sintering at high temperatures but, in addition, reduces considerably the reaction of the hot gases on the sintered products which, in the case of beryllium oxide, leads to the formation of volatile products.

Magnesium oxide gives similar results.

Under these conditions, the content of the volatile products having a beryllium hydroxide base is less than 1%, which is a great advantage, considering the cost of the raw material, the harmfulness of the escaping (lost) volatile products, and the difficulty of guarding against them.

The use of slight proportions of calcium or magnesium oxide also presents the advantage of limiting the impurities in the sintered product to a very small proportion.

Instead of starting from beryllium hydroxide, it is possible to obtain the required beryllium oxides by the thermal decomposition of oxygen-containing beryllium salts, or by the hydrothermic decomposition of halogenated salts. Among the oxygen-containing beryllium salts which are particularly suitable for the preparation of the required beryllium oxides are the nitrate and the sulfate or the acetate.

It is possible to use as organic binders: stearic acid, stearic esters, cellulose esters, mineral or vegetable waxes, plastic materials not completely polymerized. Any of these compounds may be used separately or may be combined with at least one of the others.

Hydrothermic decomposition means thermic decomposition of beryllium chloride, beryllium fluoride, beryllium bromide or beryllium iodide in the presence of water steam.

The term "open porosity of substantially zero" means that the pores are substantially closed and not intercommunicated.

I claim:
1. Process for producing sintered beryllium oxide having an open porosity of substantially zero and a density of not less than about 2.85 comprising the steps of: mixing together comminuted, substantially anhydrous light beryllium oxide having an apparent density of 0.2 to 0.3 and a specific surface not less than 100,000 cm.$^2$/g., and heavy beryllium oxide having an apparent density of 1.0 to 1.2 and a specific surface of about 5,000 cm.$^2$/g., said specific surface as measured by the Blaine method, with a quantity of an alkaline earth metal compound selected from the group consisting of alkaline earth metal oxides and salts of alkaline earth metals which, upon heating to the sintering temperature, are decomposed, yielding the corresponding metal oxides, the amount of alkaline earth metal oxide present in the sintered product being about 0.6% by weight; grinding and drying said mixture; adding a binder to the dried mixture and agglomerating the resultant mass, and thereafter baking the mass at a temperature not substantially in excess of about 1600° C.

2. Process according to claim 1, wherein the alkaline earth metal compound is calcium oxide.

3. Process according to claim 1, wherein the alkaline earth metal compound is magnesium oxide.

4. Process according to claim 1, wherein the relative proportions of heavy BeO and light BeO in the initial mixture is such that the ground mixture has a fineness corresponding to a specific surface of 18,000 to 22,000 cm.$^2$/g. as measured by the Blaine method.

5. Process according to claim 1, wherein the added alkaline earth metal compound has a fineness corresponding to a specific surface in excess of about 22,000 cm.$^2$/g. as measured by the Blaine method.

6. Process according to claim 1, wherein the ground mixture has a fineness corresponding to a specific surface of about 20,000 cm.$^2$/g.

7. Process according to claim 1, wherein the binder used is an organic binder which is added in an amount of 5 to 8% by weight.

8. A sintered beryllium oxide having an open porosity of substantially zero, and a density not less than about 2.85, said sintered beryllium oxide containing an alkaline earth metal oxide, the amount of alkaline earth metal oxide present in the sintered product being about 0.6% by weight, said sintered beryllium oxide being substantially free of impurities.

9. Process for producing sintered beryllium oxide having an open porosity of substantially zero and a density not less than about 2.85 comprising the steps of: mixing together approximately 20 parts of substantially anhydrous light beryllium oxide having a specific surface greater than 100,000 cm.$^2$/g. with approximately 80 parts of substantially anhydrous heavy beryllium oxide having a specific surface of the order of 5000 cm.$^2$/g., said specific surfaces as measured by the Blaine method, and with an alkaline earth metal compound selected from the group consisting of alkaline earth metal oxides and salts of alkaline earth metals which, upon heating to the sintering temperature are decomposed yielding the corresponding metal oxides, the amount of alkaline earth metal oxide present in the sintered product being approximately 0.6% by weight, grinding and drying to yield a mixture having a specific surface of 18,000–22,000 cm.$^2$/g., adding 5–8% by weight of an organic binder to the dried mixture and agglomerating the resultant mass, and thereafter baking the mass at a temperature not substantially in excess of about 1600° C.

References Cited in the file of this patent

UNITED STATES PATENTS

| | | |
|---|---|---|
| 1,879,589 | Tama | Sept. 27, 1932 |
| 2,033,300 | Reichmann | Mar. 10, 1936 |
| 2,308,092 | McDougal et al. | Jan. 12, 1943 |
| 2,538,959 | Ballard | Jan. 23, 1951 |